United States Patent [19]

Hoch et al.

[11] 4,167,634

[45] Sep. 11, 1979

[54] MANUFACTURE OF A PIGMENTARY FORM OF α-INDANTHRONE

[75] Inventors: Helmut Hoch; Heinrich Hiller, both of Wachenheim; Guenther Bauni, Dudenhofen, all of Fed. Rep. of Germany

[73] Assignee: BASF Aktiengesellschaft, Ludwigshafen, Fed. Rep. of Germany

[21] Appl. No.: 874,789

[22] Filed: Feb. 3, 1978

[30] Foreign Application Priority Data

Feb. 8, 1977 [DE] Fed. Rep. of Germany ....... 2705107

[51] Int. Cl.$^2$ .............................................. C09B 5/48
[52] U.S. Cl. ................................. 544/339; 260/42.21
[58] Field of Search ........................................ 544/339

[56] References Cited

U.S. PATENT DOCUMENTS

| | | | |
|---|---|---|---|
| 1,899,348 | 2/1933 | Neresheimer et al. | 544/339 |
| 2,065,928 | 12/1936 | Waldron | 544/339 |

Primary Examiner—Paul M. Coughlan, Jr.
Attorney, Agent, or Firm—Oblon, Fisher, Spivak, McClelland & Maier

[57] ABSTRACT

An α-indanthrone pigment having improved tinctorial and technological properties is produced by swelling γ-indanthrone in sulfuric acid of from 73 to 80 percent strength by weight at from 20° to 50° C. in the presence of from 0.1 to 20% by weight, based on indanthrone, of a hydroxylammonium salt, a hydrazinium salt, amidosulfonic acid, urea, a salt of urea, formaldehyde or paraformaldehyde or a mixture of these. After precipitation in water which may or may not contain a surfactant, at below 50° C., an α-indanthrone pigment of high tinctorial strength is obtained, which gives clear and pure colorations and is easily dispersible.

12 Claims, No Drawings

MANUFACTURE OF A PIGMENTARY FORM OF α-INDANTHRONE

The present invention relates to a process for the manufacture of a pigmentary form of α-indanthrone which exhibits improved tinctorial and technological properties.

Indanthrone is conventionally manufactured from the soluble leuco-derivative which is oxidized, in solution, to give insoluble indanthrone. The product obtained is in a crystal form which is greatly influenced by the conditions of manufacture and by the subsequent after-treatment. The crystal form is of minor importance when the product is used as a vat dye, but this is not true when it is used as a pigment.

Indanthrone exists in 4 polymorphic modifications respectively referred to as the α-, β-, γ- and δ-forms. The α- and β-modifications give blue dyeings with a green tinge and the γ-form gives dyeings with a reddish tinge. The δ-form is of no tinctorial value.

Amongst the indanthrone modifications, the α-form is the most stable and therefore most suitable for use as a pigment for coloring surface coatings or plastics.

The pigmentary form of α-indanthrone is manufactured by swellng γ-indanthrone in sulfuric acid of from 73 to 80 percent strength by weight, preferably from 75 to 76 percent strength by weight, at from 20° to 30° C. The γ-modification required as the starting material is obtained by oxidizing leuco-indanthrone at 50° C. and drying the press cake gently under reduced pressure. The conversion of the γ-modification to the α-modification only takes place in a narrow range of sulfuric acid concentration, namely from 73 to 80 percent strength by weight, preferably from 75 to 76 percent strength by weight, and is accompanied by swelling. This treatment with sulfuric acid is continued until microscopic examination shows a uniform crystal distribution. As a rule, this requires from 10 to 30 hours at room temperature.

The resulting suspension of α-indanthrone, which contains a high concentration of sulfuric acid, is diluted by introducing it into water which preferably contains a non-ionic surfactant, and the pigment is isolated in the conventional manner and dried.

Since slight changes in the individual process steps have a major influence on the properties of the pigment, the product obtained is of variable quality and hence of poor reproducibility. Furthermore, the pigment is difficult to disperse and gives dull and pale colorations, which in addition exhibit a marked green tinge.

It is an ojbect of the present invention to provide a process by means of which a more easily dispersible, soft-grained indanthrone pigment is obtained, which gives colorations having purer hues.

We have found that this object is achieved and that an α-indanthrone pigment of substantially improved technological and tinctorial properties is obtained by swellng γ-indanthrone in sulfuric acid of from 73 to 80 percent strength by weight at from 20° to 50° C., precipitating the mixture in water in the presence or absence of a non-ionic surfactant at below 50° C., and isolating the precipitated pigment, if the swelling is carried out in the presence of from 0.1 to 20 percent by weight, based on indanthrone, indanthrone, of a hydroxylammonium salt, hydrazinium salt, amidosulfonic acid, urea, a salt of urea, formaldehyde or paraformaldehyde or a mixture of these.

The process according to the invention gives, in a reproducible manner, a pigmentary form of α-indanthrone with which deep colorations in pure and clear hues are obtained, and which is easily dispersible in plastics and surface-coating binders.

In plasticized PVC, the α-indanthrone pigment obtainable by the process of the invention exhibits a tinctorial strength which is from 8 to 10% higher than that of the α-indanthrone pigments of the prior art, and also a purer hue. Furthermore, the α-indanthrone pigments obtained by the process of the invention give substantially deeper colorations in baking finishes. For the same pigment content, the coloration is from about 10 to 16% deeper than that obtained with the pigment of the prior art.

In general, the process is carried out as follows:

The additives according to the invention are dissolved in a 10-fold to 30-fold amount by weight, based on indanthrone, of sulfuric acid of from 73 to 80 percent strength by weight, preferably from 75 to 76 percent strength by weight. The γ-indanthrone is introduced into this solution and the mixture is homogenized by stirring. Hereupon the conversion of the γ-modification to the α-modification takes place, accompanied by swelling. The temperature should be from 15° to less than 50° C., preferably from 20° to 30° C., and especially from 20° to 25° C. The conversion time depends on the temperature, and on the intensity of stirring; in most cases the conversion is complete after 15 hours.

Additives which, according to the invention, are present during the finishing or swelling process are hydroxylammonium salts, hydroxylamine, hydrazine, hydrazinium salts, urea, urea salts, amidosulfonic acid, formaldehyde, paraformaldehyde or mixtures of these compounds. If the bases hydroxylamine, hydrazine and urea are used, the corresponding salts with sulfuric acid are formed.

Of the compounds mentioned, the reducing nitrogen compounds hydroxylamine and hydrazine and amidosulfonic acid and its salts are preferred, since their presence leads to a tinctorially particularly valuable pigmentary form.

The amounts of these additives are from 0.1 to 20 percent by weight based on indanthrone. Even larger amounts can be added, but have no advantageous or disadvantageous effect on the pigment. Preferably, the amount of additives used is from 1 to 8% by weight, based on indanthrone.

To isolate the pigmentary form, the suspension, containing a high concentration of sulfuric acid, is diluted by pouring into water, whilst keeping the temperature at below 50° C., preferably at from 30° to 40° C. The amount of water depends on the amount of sulfuric acid; in general, from 2 to 6, preferably from 2.5 to 6, parts by weight of water are taken per part by weight of sulfuric acid, but larger amounts of water may also be present. These do not alter the properties of the pigment, and merely mean that larger amounts of water have to be filtered to isolate the pigment.

Advantageously, after completion of the rearrangement or swelling, the sulfuric acid suspension is pured into water which contains from 10 to 30, preferably from 10 to 20, percent by weight, based on indanthrone, of one or more oil-soluble or water-soluble non-ionic surfactants. Here again, the temperature should not exceed 50° C. during dilution. Pigments with very advantageous tinctorial and technological properties are obtained on dilution at from 30° to 40° C.

Preferred non-ionic oil-soluble or water-soluble surfactants are the oxyethylation products of monohydric and polyhydric alcohols, of phenol, of alkylphenols (where alkyl is of 5 to 20 carbon atoms), of aromatic, cycloaliphatic or aliphatic monoamines or diamines, of long-chain carboxylic acids (of 10 to 20 carbon atoms) or of their amides, or mixtures of these oxyethylation products.

Specific examples of non-ionic oil-soluble or water-soluble surfactants are adducts of ethylene oxide with rosin (abietic acid), with oleic acid, with sperm oil alcohols, with alkanols of 12 to 15 carbon atoms, with phenol, nonylphenol, dodecylphenol and octylphenol, or with stearic acid, or mixtures of these.

On dilution, the pigment is in an easily filterable form. The suspension is filtered or centrifuged, washed neutral with water and, if required, dried under reduced pressure.

The Examples which follow illustrate the invention. Parts and percentages are by weight.

EXAMPLE 1

2 parts of hydroxylammonium sulfate are dissolved in 450 parts of 76% strength sulfuric acid, whilst stirring. 30 parts of $\gamma$-indanthrone are then introduced and the suspension is stirred for 15 hours at 20°–25° C. Therafter the sulfuric acid suspension is poured into 1,600 parts of water, the temperature of the mixture being kept at below 30° C.

Before carrying out the precipitation, 5 parts of an adduct of 5 moles of ethylene oxide with 1 mole of oleic acid, and 2 parts of an adduct of 23 moles of ethylene oxide with 1 mole of tallow fatty alcohol, were added to the water. After precipitation, the suspension is stirred for 30 minutes and then filtered on a filter press. The filter cake is washed neutral with water at 50° C. and then dried under reduced pressure at 60° C. The yield is 35 parts. In plasticized PVC, the indanthrone pigment gives colorations which are from 8 to 10% deeper and at the same time of a purer hue, than those given by the pigment of the prior art. The pigment is more readily dispersed in plasticized PVC than the pigment of the prior art.

EXAMPLE 2

2 parts of amidosulfonic acid are dissolved in 450 parts of 76% strength sulfuric acid, whilst stirring. 30 parts of $\gamma$-indanthrone are then introduced and the suspension is stirred for 15 hours at from 20° to 25° C. The sulfuric acid suspension is then forced into 1,600 parts of water under conditions which keep the temperature of the mixture at below 30° C. Before precipitation, 5 parts of an adduct of 5 moles of ethylene oxide with 1 mole of oleic acid were added to the water. After precipitation, the suspension is stirred for 30 minutes and then filtered on a filter press. The filter cake is washed neutral with water at 50° C. and then dried under reduced pressure at 60° C. The yield is 34 parts of pigment, having virtually the same tinctorial properties as that obtained as described in Example 1.

EXAMPLE 3

4 parts of urea are dissolved in 450 parts of 76% strength sulfuric acid, whilst stirring. 30 parts of $\gamma$-indanthrone are then introduced. The suspension is stirred for 15 hours at from 20° to 25° C. and is then introduced into 1,600 parts of water at a rate such that the temperature of the mixture does not rise above 30° C. Before precipitation, 5 parts of an adduct of 5 moles of ethylene oxide with 1 mole of oleic acid were added to the water. After precipitation, the suspension is stirred for 30 minutes and then filtered on a filter press. The filter cake is washed neutral with water at 50° C. and then dried under reduced pressure at 60° C. The yield is 34 parts of pigment. In plasticized PVC, the pigment gives, for the same depth of color, a somewhat greener and purer hue than the pigment of the prior art.

EXAMPLE 4

2 parts of paraformaldehyde are dissolved in 450 parts of 76% strength sulfuric acid and 30 parts of $\gamma$-indanthrone are then introduced at room temperature. The suspension is stirred at from 25° to 30° C. until all the $\gamma$-indanthrone has converted to the $\alpha$-form, which requires 17 hours.

The suspension is then introduced into 1,600 parts of water at a rate such that the temperature of the mixture does not rise above 30° C. Before precipitation, 5 parts of an adduct of 5 moles of ethylene oxide with 1 mole of oleic acid were added to the water. The suspension is filtered and the filter residue is washed neutral with water at 50° C. and then dried under reduced pressure at 60° C. Yield, 34 parts of pigment.

In a baking finish, the pigment obtained gives colorations which are about 16% deeper than those obtained with the indanthrone pigment of the prior art. At the same time, the new indanthrone pigment gives somewhat greener and purer shades than the pigment of the prior art.

We claim:

1. In a process for the manufacture of a pigmentary form of $\alpha$-indanthrone by swelling $\gamma$-indanthrone in sulfuric acid of from 73 to 80 percent strength by weight at from 20° to 50° C., and precipitating the mixture in water at below 50° C., and isolating the precipitated pigment, the improvement that the swelling is carried out in the presence of from 0.1 to 20 percent by weight, based on indanthrone, of a hydroxylammonium salt, of a hydrazinium salt, amidosulfonic acid, urea, a salt of urea, formaldehyde, paraformaldehyde, or a mixture thereof.

2. A process as claimed in claim 1, wherein the swelling is carried out in the presence of from 1 to 8 percent by weight, based on indanthrone, of the agents named in claim 1.

3. A process as claimed in claim 1, wherein the swelling is carried out in the presence of a hydroxylammonium salt, a hydrazinium salt, amidosulfonic acid or a mixture thereof.

4. A process as claimed in claim 1, wherein the swelling is carried out in the presence of formaldehyde or paraformaldehyde or a mixture thereof.

5. A process as claimed in claim 1, wherein the swelling is carried out in the presence of a hydroxylammonium salt, a hydrazinium salt or amidosulfonic acid or a mixture of these, in sulfuric acid of from 75 to 76 percent stregth by weight, at from 20° to 30° C., the mixture of pigment and sulfuric acid is then introduced into from 3.5 to 6 parts by weight of water, per part by weight of sulfuric acid, in the presence of from 10 to 20 percent by weight, based on the pigment, of one or more non-ionic surfactants, at from 30° to 40° C., the pigment is then separated off.

6. A process as claimed in claim 1, wherein the non-ionic surfactant is an oxyethylation product of a monohydric or dihydric alcohol, of phenol, of a $C_5$- to $C_{20}$- alkylphenol, of an aromatic, monoamine or diamine, of a carboxylic acid having from 10 to 20 carbon atoms or its amide or a mixture thereof.

7. A process as claimed in claim 5, wherein the non-ionic surfactant is an adduct of ethylene oxide with rosin, oleic acid, a sperm oil alcohol, an alkanol of 12 to 15 carbon atoms, phenol, nonylphenol, dodecylphenol, octylphenol, stearic acid or a mixture of two or more thereof.

8. The process of claim 1 wherein said swelling is carried out in the presence of hydroxylammonium salt.

9. The process of claim 1 wherein said swelling is carried out in the presence of amidosulfonic acid.

10. The process of claim 1 wherein said swelling is carried out in the presence of urea.

11. The process of claim 1 wherein said swelling is carried out in the presence of a salt of urea.

12. The process of claim 1 wherein said swelling is carried out in the presence of formaldehyde or paraformaldehyde.

* * * * *